United States Patent
Le et al.

(10) Patent No.: US 9,644,675 B2
(45) Date of Patent: May 9, 2017

(54) FOLDED FLUID CHANNEL FOR A FLUID DYNAMIC BEARING

(75) Inventors: Lynn B. Le, San Jose, CA (US); Alan L. Grantz, Aptos, CA (US)

(73) Assignee: Seagate Technology LLC, Cupertino, CA (US)

( * ) Notice: Subject to any disclaimer, the term of this patent is extended or adjusted under 35 U.S.C. 154(b) by 1434 days.

(21) Appl. No.: 12/117,619

(22) Filed: May 8, 2008

(65) Prior Publication Data

US 2009/0279818 A1    Nov. 12, 2009

(51) Int. Cl.
*F16C 32/06* (2006.01)
*F16C 33/10* (2006.01)
*F16C 41/00* (2006.01)
*F16C 17/10* (2006.01)

(52) U.S. Cl.
CPC ........ *F16C 32/0633* (2013.01); *F16C 17/105* (2013.01); *F16C 17/107* (2013.01); *F16C 33/107* (2013.01); *F16C 33/1085* (2013.01); *F16C 41/008* (2013.01); *F16C 2370/12* (2013.01)

(58) Field of Classification Search
USPC ............. 384/100, 107, 114, 130, 119, 132
See application file for complete search history.

(56) References Cited

U.S. PATENT DOCUMENTS

| | | | |
|---|---|---|---|
| 2004/0096131 A1* | 5/2004 | Aiello et al. | 384/119 |
| 2004/0184688 A1* | 9/2004 | Le et al. | 384/107 |
| 2004/0212921 A1* | 10/2004 | Herndon et al. | 360/99.08 |
| 2004/0264819 A1* | 12/2004 | Weingord et al. | 384/107 |
| 2006/0039636 A1* | 2/2006 | Ichiyama | 384/107 |
| 2008/0260310 A1* | 10/2008 | Bauer et al. | 384/107 |

* cited by examiner

*Primary Examiner* — William Kelleher
*Assistant Examiner* — Gregory T Prather

(57) ABSTRACT

A system and method are provided for sealing a fluid dynamic bearing motor. A first and a second folded fluid channel are shaped for maximizing bearing axial span and establishing angular stiffness, to resist gyroscopic rocking of the facing bearing surfaces. The first folded fluid channel is limited to occupying at least a portion of the same axial space as the bearing. A first and a second fluid sealing system are connected to opposite axial ends of the bearing. The first fluid sealing system forms an active pumping seal to pump fluid during motor rotation. In an aspect, a top cover attached shaft, and a single thrust surface are employed, allowing for a rigid motor structure and power reduction in applications including high rotational speed disc drives. Also, by employing a rigid shaft design, significantly lower amplitude radial vibration responses are exhibited at higher frequencies than prior art motor designs.

34 Claims, 5 Drawing Sheets

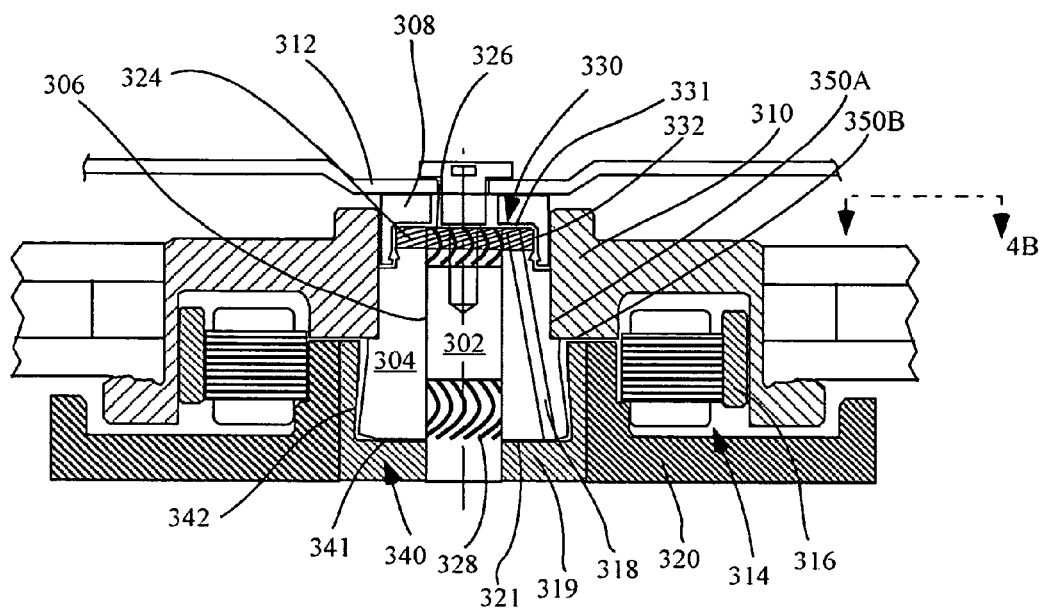
Fig. 3
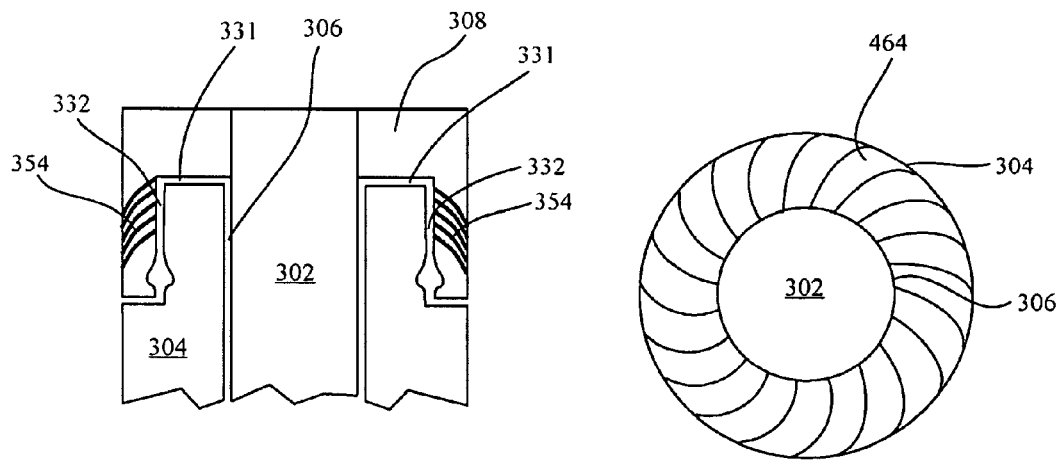
Fig. 4A
Fig. 4B

FOLDED FLUID CHANNEL FOR A FLUID DYNAMIC BEARING

BACKGROUND

Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified including improved resistance to shock events including axial and angular shock resistance, vibration response, and improved robustness.

The read/write heads must be accurately aligned with the storage tracks on the disc to ensure the proper reading and writing of information. Moreover, a demand exists for increased storage capacity and smaller disc drives, which has led to the design of higher recording areal density such that the read/write heads are placed increasingly closer to the disc surface. Precise alignment of the heads with the storage tracks is needed to allow discs to be designed with greater track densities, thereby allowing smaller discs and/or increasing the storage capacity of the discs. Because rotational accuracy is critical, many disc drives presently utilize a spindle motor having a fluid dynamic bearing (FDB) situated between a shaft and sleeve to support a hub and the disc for rotation. In a hydrodynamic bearing, a lubricating fluid is provided between a fixed member bearing surface and a rotating member bearing surface of the disc drive. Hydrodynamic bearings, however, suffer from sensitivity to external loads or mechanical shock. In particular, the stiffness of the fluid dynamic bearing is critical so that the rotating load is accurately and stably supported on the spindle without wobble or tilt. Further, with disc drive memory systems being utilized in progressively more environments including mobile environments, reduced power consumption by the motor is desired.

SUMMARY

An apparatus and method are described herein for application to a fluid dynamic bearing motor. A fluid dynamic bearing is defined between a stationary component and a rotatable component. A shaft and a base structure are affixed to the stationary component. A first fluid sealing system is connected to a first axial end of the bearing, and a second fluid sealing system is connected to a second axial end of the bearing. The first fluid sealing system employs a first folded fluid channel and the second fluid sealing system employs a second folded fluid channel, wherein the first and the second folded fluid channels are defined by facing surfaces of the stationary component and the rotatable component. The first fluid sealing system forms an active pumping seal for pumping fluid when the stationary component and the rotatable component are relatively rotating. The first folded fluid channel is limited to occupying at least a portion of the same axial space as the bearing, and positioned radially outboard of the bearing. The first and the second folded fluid channels are shaped for maximizing bearing axial span and establishing angular stiffness to resist gyroscopic rocking of the facing bearing surfaces. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3 is a sectional side view of a fluid dynamic bearing motor incorporating a fixed shaft and folded fluid channels, in accordance with an embodiment of the present invention;

FIG. 4A is a sectional side view of an enlarged portion of the fluid dynamic bearing motor as in FIG. 3, illustrating details of a folded fluid channel and grooves, in accordance with an alternative embodiment of the present invention;

FIG. 4B is a top plan view of an enlarged portion of the fluid dynamic bearing motor taken from the reference 4B as shown in FIG. 3, illustrating grooves on a radially extending portion of a surface of the folded fluid channel, in accordance with an another embodiment of the present invention;

DETAILED DESCRIPTION

Figure 1:
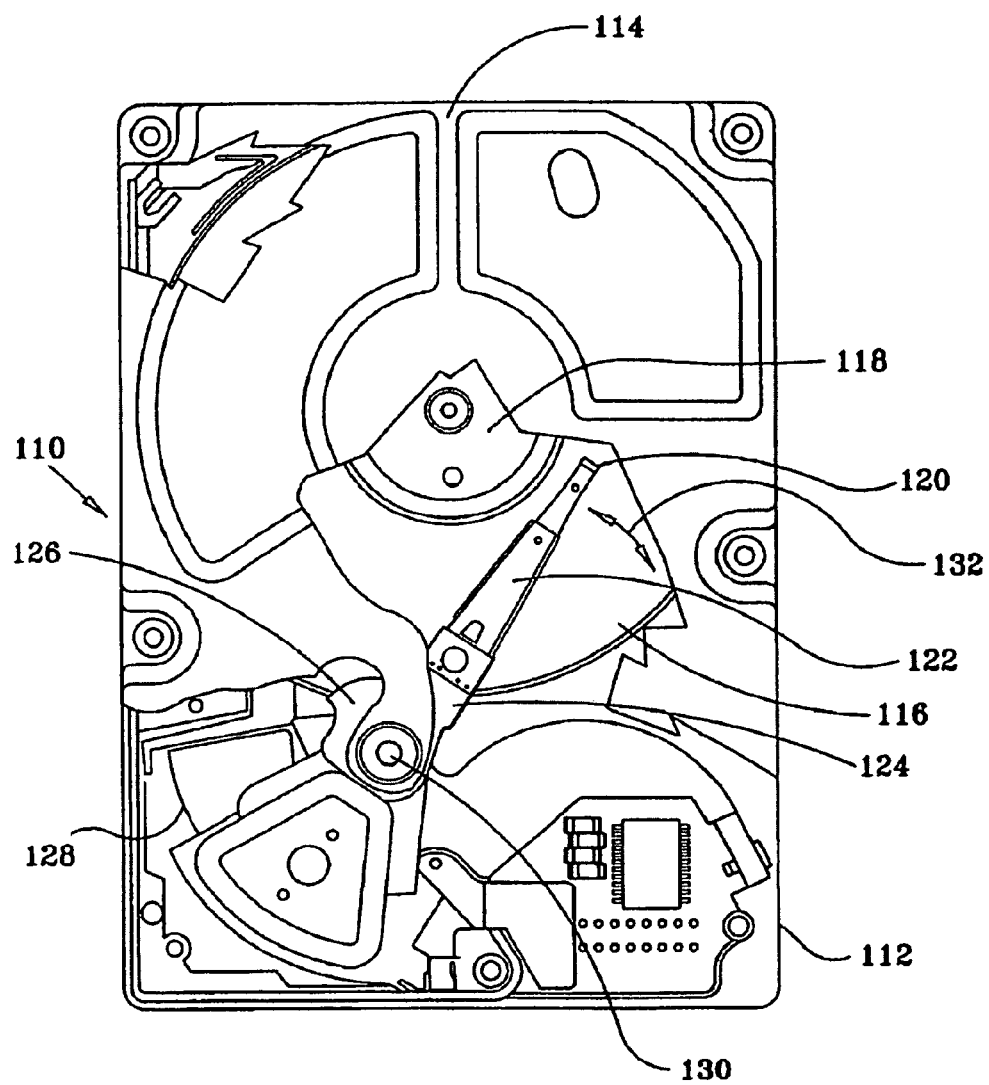
FIG. 1 is a top plan view of a disc drive data storage system in which the present invention is useful, in accordance with an embodiment of the present invention.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A system and method are described herein for application to a fluid dynamic bearing motor. A fluid dynamic bearing is defined between a stationary component and a rotatable component. A shaft and a base structure are affixed to the stationary component. A first fluid sealing system is connected to a first axial end of the bearing, and a second fluid sealing system is connected to a second axial end of the bearing. The first fluid sealing system employs a first folded fluid channel and the second fluid sealing system employs a second folded fluid channel, wherein the first and the second folded fluid channels are defined by facing surfaces of the stationary component and the rotatable component. The first fluid sealing system forms an active pumping seal for pumping fluid when the stationary component and the rotatable component are relatively rotating. The first folded fluid channel is limited to occupying at least a portion of the same axial space as the bearing, and positioned radially outboard of the bearing. The first and the second folded fluid channels are shaped for maximizing bearing axial span and establishing angular stiffness to resist gyroscopic rocking of the facing bearing surfaces. By employing a rigid shaft design, the present invention exhibits significantly lower amplitude radial vibration responses at higher frequencies than prior art motor designs employing a rotating shaft design. An embodiment of the present invention employs a top cover attached shaft, and a single thrust surface, allowing for a rigid structure and power reduction in applications including high rotational speed disc drives.

It will be apparent that features of the discussion and claims may be utilized with disc drive memory systems, low profile disc drive memory systems, spindle motors, brushless DC motors, various fluid dynamic bearing designs including hydrodynamic and hydrostatic bearings, and other motors employing a stationary and a rotatable component, including motors employing conical bearings. Also, as used herein, the terms "axially" or "axial direction" refers to a direction along a centerline axis length of the shaft (i.e., along axis 260 of shaft 202 shown in FIG. 2), and "radially" or "radial direction" refers to a direction perpendicular to the centerline axis 260, and passing through centerline axis 260. Also, as used herein, the expressions indicating orientation such as "upper", "lower", "top", "bottom" and the like, are applied in a sense related to normal viewing of the figures rather than in any sense of orientation during particular operation, etc. These orientation labels are provided simply to facilitate and aid understanding of the figures as described in this Description and should not be construed as limiting.

Referring to the drawings wherein identical reference numerals denote the same elements throughout the various views, FIG. 1 illustrates a top plan view of a typical disc drive data storage system 110 in which the present invention is useful. Clearly, features of the discussion and claims are not limited to this particular design, which is shown only for purposes of the example. Disc drive 110 includes base plate 112 that is combined with cover 114 forming a sealed environment to protect the internal components from contamination by elements outside the sealed environment. Disc drive 110 further includes disc pack 116, which is mounted for rotation on a spindle motor (as described in FIG. 2) by disc clamp 118. Disc pack 116 includes a plurality of individual discs, which are mounted for co-rotation about a central axis. Each disc surface has an associated read and write head 120, which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
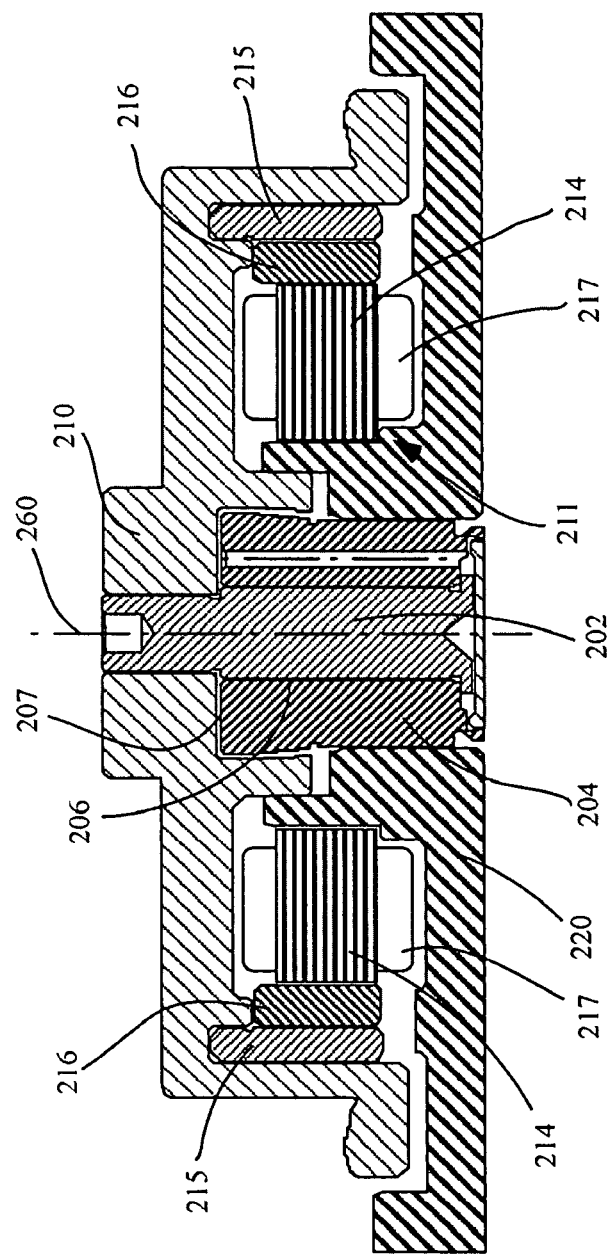
FIG. 2 is a sectional side view of a contemporary spindle motor used in a disc drive data storage system incorporating a rotatable shaft and stationary sleeve.

Referring to FIG. 2, a sectional side view is illustrated of a contemporary spindle motor as used in a disc drive data storage system 110, incorporating a base plate 220. This fluid dynamic bearing motor includes a rotatable component that is relatively rotatable about a stationary component, defining a journal bearing 206 therebetween. In this example, the rotatable components include shaft 202 and hub 210. Hub 210 includes a disc flange, which supports disc pack 116 (shown in FIG. 1) for rotation about axis 260 of shaft 202. Shaft 202 and hub 210 are integral with backiron 215. One or more magnets 216 are attached to a periphery of backiron 215. The magnets 216 interact with a lamination stack 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form one or more magnetic poles. The stationary components include sleeve 204 and stator 211, which are affixed to base plate 220. Stator 211 is comprised of lamination stack 214 and stator windings 217. Bearing 206 is established between the sleeve 204 and the rotating shaft 202. A thrust bearing 207 is established between hub 210 and sleeve 204. Thrust bearing 207 provides an upward force on hub 210 to counterbalance the downward forces including the weight of hub 210, axial forces between magnet 216 and base plate 220, and axial forces between stator lamination stack 214 and magnet 216. In the case of a fluid dynamic bearing spindle motor, a fluid, such as lubricating oil fills the interfacial regions between shaft 202 and sleeve 204, and between hub 210 and sleeve 204, as well as between other stationary and rotatable components. While the present figure is described herein with a lubricating fluid, those skilled in the art will appreciate that useable fluids include a liquid, a gas, or a combination of a liquid and a gas.

Turning now to FIG. 3, a sectional side view is shown of a fluid dynamic bearing motor incorporating a fixed shaft 302 and folded fluid channels, in accordance with an embodiment of the present invention. A journal bearing 306 is defined between shaft 302 and sleeve 304, the shaft 302 and sleeve 304 positioned for relative rotation. As described in FIG. 2, magnet 316 interacts with stator 314 to cause the sleeve 304 and hub 310 to rotate. The shaft 302 is fixed to a base structure. Here, shaft 302 is fixed to base cup 319, and base cup 319 is fixed to baseplate 320. Alternatively, base cup 319 and baseplate 320 may be an integral component that is fixed to shaft 302. As used herein, "base structure" means a base cup, a baseplate, or an integral base cup and baseplate.

Fluid sealing system 330, comprising radially extending channel portion 331 and axially extending channel portion 332, forms an active pumping seal. An active pumping seal is defined herein as a type of fluid seal that builds pressure dynamically, and that employs active pumping when the shaft and the sleeve (or relatively rotatable components) are relatively rotating. The pressure is created by relative motion between the stationary and rotatable components. Fluid sealing system 330 is a folded fluid channel. A folded fluid channel is defined herein as including an axially extending channel portion and a radially extending channel portion. For example, radially extending channel portion 331 and axially extending channel portion 332 comprises a folded fluid channel. Fluid sealing system 340 is also a folded fluid channel, comprising radially extending channel portion 341 and axially extending channel portion 342. These channels 331, 332, 341 and 342 are defined by facing surfaces of a stationary component and a rotatable component.

The fluid sealing systems 330 and 340 are limited to occupying at least a portion of the same axial space as the bearing 306, and positioned radially outboard of the bearing 306. Thus, the fluid sealing systems 330 and 340 are shaped for maximizing axial span for bearing 306, and do not occupy axial space that bearing 306 could otherwise utilize. Also, by maximizing axial length for the bearing 306, angular stiffness is increased, and shaft 302 better resists gyroscopic rocking of the facing bearing surfaces.

In an embodiment, the bearing 306 employs asymmetric fluid sealing in which a grooved pumping seal is employed at fluid sealing system 330, and a capillary seal is employed at fluid sealing system 340. In another embodiment, a grooved pumping seal is employed at fluid sealing system 330, and grooves are situated on at least one of a facing surface of radially extending channel portion 331 (grooves 464 as shown in FIG. 4B), and a facing surface of axially extending channel portion 332 (grooves 324). In yet another embodiment, a capillary seal forms on a facing surface of axially extending channel portion 332 when the rotatable component is stationary. When the rotatable component is relatively rotating, a facing surface of radially extending channel portion 331 forms an active pumping seal.

Top grooves 326 and bottom grooves 328 are formed on shaft 302, although may alternatively be formed on the opposing facing surface of the sleeve. These asymmetric grooves may have a pattern including a herringbone pattern or a sinusoidal pattern inducing fluid flow in the interfacial region and generating a localized region of dynamic high pressure and radial stiffness. These grooves are situated at an upper and a lower axial portion of the journal bearing 306, separated by a separator region. In an embodiment, the bottom grooves 328 are formed with an asymmetric leg that is longer in length than an asymmetric leg of the top grooves 326. The extended leg of the top grooves 326 is formed with a length to limit or prevent negative pressure in the separator region. The extended leg of the bottom grooves 328 is formed to prevent reverse fluid circulation flow, when the fluid circulation is intended to flow upward from bottom grooves 328 toward top grooves 326. Also, less power is consumed by the motor by reducing the extended length of the top grooves 326 asymmetric leg.

The shaft 302 is attached to a top cover 312, for increasing rigidity of the shaft 302 and entire motor. By attaching the shaft 302 to the top cover 312, the cantilever gyro is substantially centered at an axial midpoint of the bearing 306, since the shaft 302 is attached at both axial ends. Also, by attaching a shaft to a top cover and to the motor baseplate, the radial and angular stiffnesses of a bearing structure are substantially increased over that of contemporary motor designs employing a rotating shaft in which the support for the bearing structure is attached only to a baseplate. Further, because the present invention shaft 302 is fixed and attached at both axial ends, the axial thickness of the base plate 320 and/or base cup 319 may be minimized without loss of structural rigidity.

A single thrust surface 321 is created by pressure generating grooves formed on at least one radially extending facing surface of the sleeve 304 and the motor cup 319 (or baseplate 320). These grooves provide pressure as the sleeve 304 rotates, and support the sleeve 304 and hub 310 for constant rotation.

A limiter 308 is employed to limit axial movement of the rotatable component with respect to the stationary component. In the example shown, the facing surfaces of the limiter 308 and the sleeve 304 limit the axial movement. The limiter component 308 is attached to, or in contact with, at least one of the shaft 302 and the top cover 312.

A recirculation passageway 318 is formed through the sleeve 304 for fluidly connecting the first axial end of the bearing at or near the fluid sealing system 330 with the second axial end of the bearing at or near the fluid sealing system 340. Fluid recirculation is further discussed in FIG. 5.

The sleeve 304 and the hub 310 (both rotatable components) have facing surfaces shaped with an axial step engagement 350A and a radial step engagement 350B, for affixing the sleeve 304 and the hub 310. Certainly, offset load capability and total indicated runout (TIR) are design concerns. In contemporary designs having a smaller engagement area, the joint at facing surfaces of the sleeve and hub may shift. The present invention utilizes both axial and radial engagement having lengthy surface areas, providing a stronger joint at the facing surface of the sleeve 304 and the hub 310.

As illustrated in FIG. 4A, a sectional side view is shown of an enlarged portion of the fluid dynamic bearing motor as in FIG. 3, illustrating details of a folded fluid channel and grooves, in accordance with an alternative embodiment of the present invention. Grooves 354 are situated on the surface of the limiter 308 that faces sleeve 304 at axially extending channel portion 332. Alternatively, grooves may be formed on the sleeve 304 (grooves 324, FIG. 3). When the sleeve 304 is rotating, grooves 354 (or grooves 324) create an active pumping seal.

In an embodiment, grooves are formed on the axially extending channel 332, and the gap is increased at the radially extending channel 331 between the sleeve 304 and the limiter 308, resulting in reduced power consumption by the motor.

FIG. 4B is a top plan view of an enlarged portion of the fluid dynamic bearing motor taken from the reference 4B as shown in FIG. 3. Here, grooves 464 are employed on radially extending portion 331 of a surface of the folded fluid channel 330, in accordance with another embodiment of the present invention. As shown, spiral grooves 464 are formed on the axial top of sleeve 304 facing limiter 312. Alternatively, grooves may be employed on the limiter 312 facing the axial top of the sleeve 304. Grooves 464 form a grooved pumping seal within the fluid channel 330.

Figure 5:
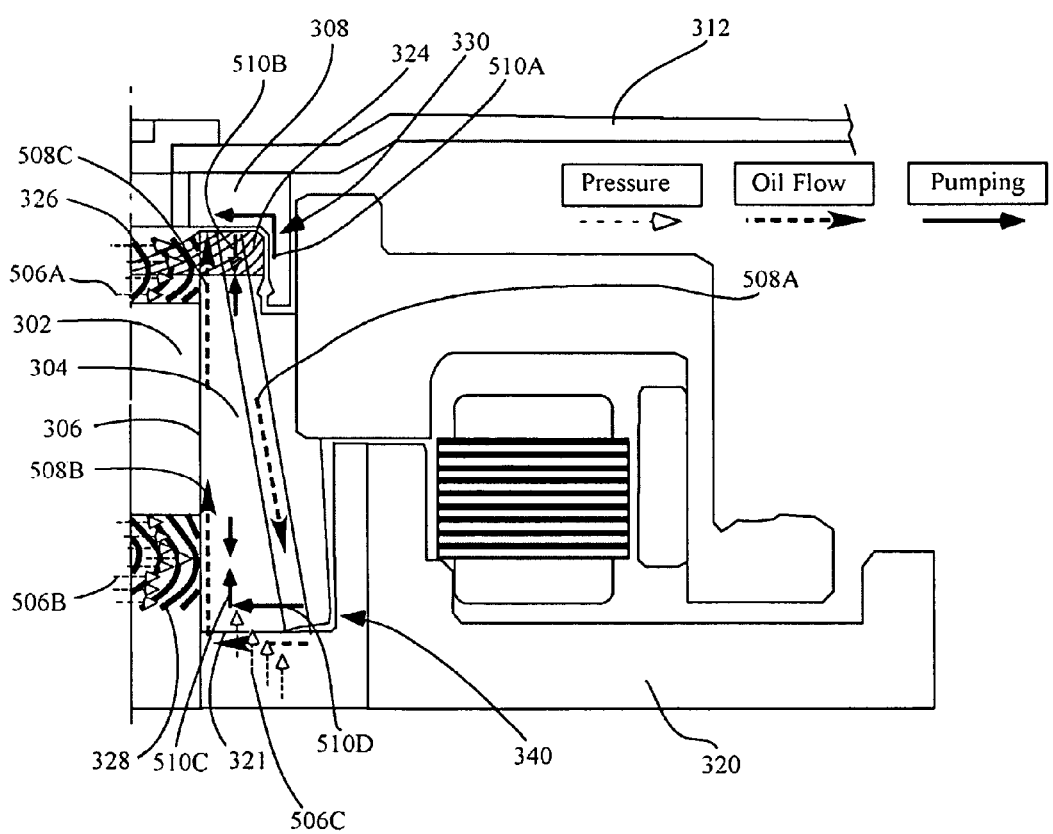
FIG. 5 is a sectional side view of an enlarged portion of the fluid dynamic bearing motor as in FIG. 3, illustrating pressure, oil flow and pumping details of the motor, in accordance with an embodiment of the present invention.

Referring to FIG. 5, a sectional side view is shown of an enlarged portion of the fluid dynamic bearing motor of FIG. 3, illustrating pressure, oil flow and pumping details of the motor, in accordance with an embodiment of the present invention. Bearing system 306 utilizes asymmetric fluid sealing in which a grooved pumping seal (a lower fluid volume and higher stiffness seal) is employed at fluid sealing system 330, and a capillary seal (a higher fluid volume and lower stiffness seal) is employed at fluid sealing system 340. That is, when the sleeve 304 is rotating relative to the shaft 302, grooves 324 (or alternatively, grooves 354 of FIG. 4A, or grooves 464 of FIG. 4B) create an active pumping seal forcing fluid as shown by arrow 51A. In an embodiment, when the sleeve 304 is stationary relative to the shaft 302, and centrifugal force subsides, a capillary seal forms on a facing surface of axially extending channel portion of fluid sealing system 330.

Thrust surface 321 provides an upward force (pressure 506C) separating the rotatable component and the stationary component, generates pumping pressure and drives fluid recirculation toward fluid bearing system 306, as shown by pumping arrow 510D to pump fluid as shown by oil flow arrow 508B.

Top grooves 326 generate a localized region of dynamic high pressure and radial stiffness (pressure 506A), and pump fluid as shown by arrows 510B. Similarly, bottom grooves 328 generate a localized region of dynamic high pressure and radial stiffness (pressure 506B), and pump fluid as shown by arrows 510C. The fluid flows through fluid bearing system 306 as shown by oil flow arrows 508B and 508C, and then through fluid recirculation passageway 318, formed through the sleeve 304, in the direction as shown by oil flow arrow 508A. Recirculation of the fluid purges any air within the journal bearing system 306.

Figure 6:
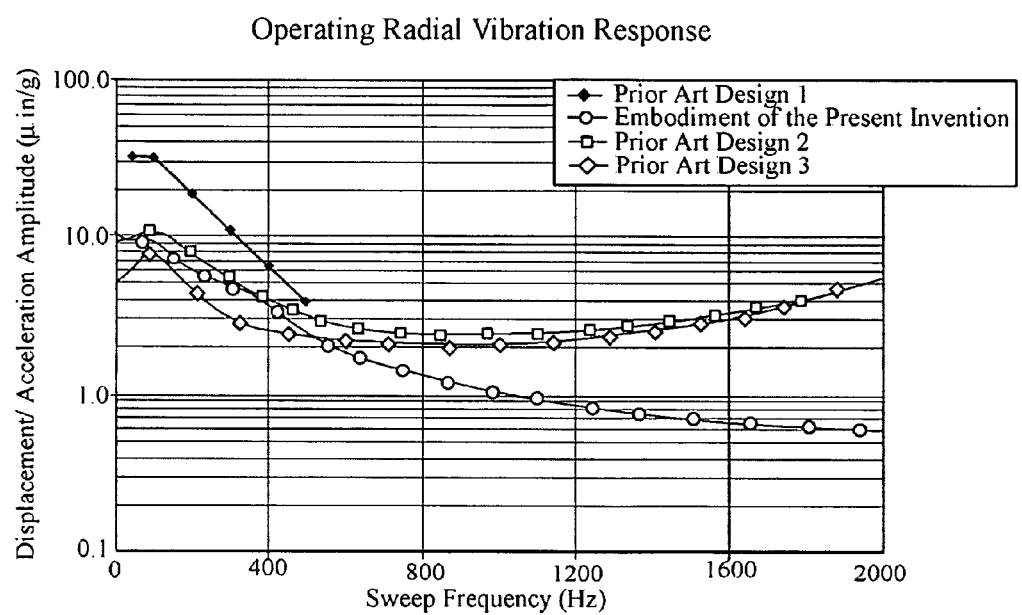
FIG. 6 is a graphical illustration of operating radial vibration response simulations for three prior art designs versus an embodiment of the present invention design, in accordance with an embodiment of the present invention.

FIG. 6 is a graphical illustration of operating radial vibration response simulations for three prior art designs versus an embodiment of the present invention design. Sweep frequency (Hz.) is plotted against displacement/acceleration amplitude (μin/g). In the prior art designs, measurements of resonance modes excited from the spindle/disc rocking mode coincide with harmonics from the rotating shaft designs. As illustrated by the graph, an embodiment of the present invention (having a rigid structure) exhibits significantly lower amplitude responses at higher frequencies than prior art motor designs employing a rotating shaft design.

Modifications and variations may be made to the disclosed embodiments while remaining within the spirit and scope of the invention. The implementations described above and other implementations are within the scope of the following claims.

We claim:

1. A motor comprising:
   a first fluid sealing system comprising a first air-fluid interface connected to a first axial end of a bearing, wherein:
      the bearing is defined between a stationary component and a rotatable component,
      the rotatable component comprises a hub,
      the stationary component comprises a shaft, and
      the shaft is stationary with respect to a hard drive base plate; and
   a second fluid sealing system comprising a second air-fluid interface connected to a second axial end of the bearing, wherein:
      the first fluid sealing system comprises a first folded fluid channel and the second fluid sealing system comprises a second folded fluid channel, the first and the second folded fluid channels defined by facing surfaces of the stationary component and the rotatable component, wherein the first folded fluid channel comprises a first and a second axially extending portions, and a radially extending portion, wherein the radially extending portion radially extends outward from the first axially extending portion and wherein the second axially extending portion axially extends downward from the radially extending portion toward the hard drive base plate,
      the first fluid sealing system forms an active pumping seal for pumping fluid when the stationary component and the rotatable component are relatively rotating, and wherein fluid flows in the first axially extending portion during rotation of the rotatable component relative to the stationary component,
      the first folded fluid channel occupies a portion of the same axial space as the bearing, and is positioned radially outboard of the bearing.

2. The motor as in claim 1, wherein:
   the bearing comprises an asymmetric fluid sealing system,
   the active pumping seal is a grooved pumping seal at the first fluid sealing system, and
   the second fluid sealing system comprises a capillary seal.

3. The motor as in claim 1, wherein:
   the active pumping seal of the first fluid sealing system is a grooved pumping seal, and
   grooves are on at least one of an axially extending portion of a facing surface of the first folded fluid channel and a radially extending portion of a facing surface of the first folded fluid channel.

4. The motor as in claim 1, wherein:
   the first fluid sealing system further forms a capillary seal on an axially extending portion of a facing surface of the first folded fluid channel when the rotatable component is stationary, and
   the active pumping seal is formed on a radially extending portion of a facing surface of the first folded fluid channel when the stationary component and the rotatable component are relatively rotating.

5. The motor as in claim 1, further comprising
   top grooves having an asymmetric groove pattern formed at the first axial end of the bearing, and
   bottom grooves having an asymmetric groove pattern formed at the second axial end of the bearing, wherein the bottom grooves are formed with an asymmetric leg that is longer than an asymmetric leg of the top grooves.

6. The motor as in claim 1, wherein the shaft is attached to a top cover.

7. The motor as in claim 1, further comprising
   a single thrust surface formed by grooves on at least one radially extending facing surface of the stationary component and the rotatable component, wherein
      the single thrust surface is operable to provide a force to separate the rotatable component from the stationary component.

8. The motor as in claim 1, further comprising:
   a limiter formed by facing surfaces of the stationary component and the rotatable component, wherein
      the limiter is operable to limit axial movement of the rotatable component with respect to the stationary component.

9. The motor as in claim 1, further comprising
   a recirculation passageway formed through the rotatable component, wherein
      the recirculation passageway fluidly connects the first axial end of the bearing with the second axial end of the bearing.

10. The motor as in claim 1, wherein:
    the rotatable component further comprises a sleeve, and
    the sleeve and the hub have facing surfaces shaped with an axial and a radial step engagement.

11. An apparatus comprising:
a fluid dynamic bearing defined between a stationary component and a rotatable component, wherein:
the rotatable component comprises a hub,
the stationary component comprises a shaft, and
the shaft is stationary with respect to a hard drive base plate;
a first fluid sealing system comprising a first air-fluid interface disposed at a first axial end of the fluid dynamic bearing, wherein:
the first fluid sealing system comprises;
a first folded fluid channel defined by facing surfaces of the stationary component and the rotatable component, wherein the first folded fluid channel comprises a first and a second axially extending portions, and a first radially extending portion, wherein the first radially extending portion radially extends outward from the first axially extending portion and wherein the second axially extending portion axially extends downward from the first radially extending portion toward the hard drive base plate, and wherein fluid flows in the first axially extending portion during rotation of the rotatable component relative to the stationary component;
the first folded fluid channel is positioned in the same axial space as the bearing, and
the first folded fluid channel is positioned radially outboard of the bearing; and
a second fluid sealing system comprising a second air-fluid interface disposed at a second axial end of the fluid dynamic bearing, wherein
the second fluid sealing system comprises a second folded fluid channel defined by facing surfaces of the stationary component and the rotatable component.

12. The apparatus of claim 1, further comprising a grooved pumping seal at the first axial end of the fluid dynamic bearing, and a capillary seal at the second axial end of the fluid dynamic bearing.

13. The apparatus of claim 1, further comprising a grooved pumping seal comprising grooves on at least one of an axially extending portion of a facing surface of the first folded fluid channel and a radially extending portion of a facing surface of the first folded fluid channel.

14. The apparatus of claim 1, further comprising a capillary seal at the first axially extending channel portion.

15. The apparatus of claim 1, further comprising:
top grooves having an asymmetric groove pattern formed at the first axial end of the bearing; and
bottom grooves having an asymmetric groove pattern formed at the second axial end of the bearing, wherein the bottom grooves are formed with an asymmetric leg that is longer than an asymmetric leg of the top grooves.

16. The apparatus of claim 1, further comprising an active pumping seal formed on a radially extending portion of a facing surface of the first folded fluid channel.

17. The apparatus of claim 1, further comprising a thrust surface formed by grooves on at least one radially extending facing surface of the stationary component and the rotatable component.

18. The apparatus of claim 1, further comprising a limiter attached to at least one of the shaft and a top cover, wherein
the limiter is positioned to face a surface of the rotatable component.

19. The apparatus of claim 1, further comprising a recirculation passageway defined through the rotatable component.

20. The apparatus of claim 1, wherein
the rotatable component comprises a sleeve, and wherein further
the sleeve and the hub have facing surfaces shaped with an axial and a radial step engagement.

21. A hard drive comprising:
a fluid dynamic bearing defined between at least one stationary component and a rotatable component, wherein:
the at least one stationary component comprises a shaft,
the shaft is stationary with respect to a base plate, and
the rotatable component comprises a hub;
a first fluid channel disposed at a first axial end of the rotatable component, wherein a first portion of the fluid channel is axially above the fluid dynamic bearing and extending radially outward from the shaft and wherein a second portion of the fluid channel is radially outside of the fluid dynamic bearing and extends axially downward from the first portion toward the base plate, wherein the first portion and the second portion are both defined by the stationary component and the rotatable component, wherein the
first axially extending channel portion comprises a first air-fluid interface, and wherein
the first fluid channel is defined by facing surfaces of the at least one stationary component and the rotatable component, and
the first fluid channel is positioned radially outward of the bearing in the same axial space; and
a second fluid channel disposed at a second axial end of the rotatable component, wherein
the second fluid channel comprises;
a second axially extending channel portion comprising a second air-fluid interface; and
a second radially extending channel portion.

22. The apparatus of claim 21, wherein
the first axially extending channel portion comprises an active pumping seal.

23. The apparatus of claim 21, wherein
the second axially extending channel portion comprises a capillary seal.

24. The apparatus of claim 21, wherein
the first radially extending channel portion and the second radially extending channel portion are fluidly coupled by a recirculation passageway through the rotatable component.

25. The apparatus of claim 21, further comprising a limiter disposed at an end of the shaft.

26. The apparatus of claim 21, wherein
a fluid circulates radially inward through the second radially extending channel portion.

27. The apparatus of claim 21, wherein:
a fluid flows from the second fluid channel to the fluid dynamic bearing, and the fluid flows from the fluid dynamic bearing to the first fluid channel.

28. A hard drive comprising:
a fluid dynamic bearing defined between at least one stationary component and a rotatable component, wherein:
the at least one stationary component comprises a shaft,
the shaft is stationary with respect to a base plate, and
the rotatable component comprises a hub;

a first folded fluid channel comprising a first air-fluid interface disposed at a first axial end of the rotatable component, wherein:
  the first folded fluid channel is defined by facing surfaces of the at least one stationary component and the rotatable component, and
  the first folded fluid channel is positioned radially outward of the bearing in the same axial space, wherein the first folded fluid channel comprises a first and a second axially extending portions, and a first radially extending portion, wherein the first radially extending portion radially extends outward from the first axially extending portion and wherein the second axially extending portion axially extends downward from the first radially extending portion toward the base plate; and
a second folded fluid channel comprising a second air-fluid interface disposed at a second axial end of the rotatable component, wherein
  the second folded fluid channel is defined by facing surfaces of the at least one stationary component and the rotatable component.

29. The apparatus of claim 28, wherein
the first folded fluid channel comprises an active pumping seal.

30. The apparatus of claim 28, wherein
the second folded fluid channel comprises a capillary seal.

31. The apparatus of claim 28, wherein
the first folded fluid channel and the second folded fluid channel are fluidly coupled by a recirculation passageway through the rotatable component.

32. The apparatus of claim 28, further comprising
a limiter disposed at an end of the shaft.

33. The apparatus of claim 28, wherein
a fluid circulates radially inward through the second folded fluid channel.

34. The apparatus of claim 28, wherein:
a fluid flows from the second folded fluid channel to the fluid dynamic bearing, and the fluid flows from the fluid dynamic bearing to the first folded fluid channel.

* * * * *

UNITED STATES PATENT AND TRADEMARK OFFICE
CERTIFICATE OF CORRECTION

PATENT NO. : 9,644,675 B2  Page 1 of 1
APPLICATION NO. : 12/117619
DATED : May 9, 2017
INVENTOR(S) : Le et al.

It is certified that error appears in the above-identified patent and that said Letters Patent is hereby corrected as shown below:

In the Claims

In Column 9, Line 34, delete "1" and insert -- 11 --, therefore,

In Column 9, Line 38, delete "1" and insert -- 11 --, therefore,

In Column 9, Line 44, delete "1" and insert -- 11 --, therefore,

In Column 9, Line 47, delete "1" and insert -- 11 --, therefore,

In Column 9, Line 55, delete "1" and insert -- 11 --, therefore,

In Column 9, Line 59, delete "1" and insert -- 11 --, therefore,

In Column 9, Line 64, delete "1" and insert -- 11 --, therefore,

In Column 10, Line 1, delete "1" and insert -- 11 --, therefore,

In Column 10, Line 4, delete "1" and insert -- 11 --, therefore.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*